(12) United States Patent
Savolainen et al.

(10) Patent No.: US 7,940,697 B2
(45) Date of Patent: May 10, 2011

(54) TRANSITION BETWEEN IP PROTOCOL VERSIONS

(75) Inventors: Teemu Ilmari Savolainen, Nokia (FI); Kaisu Maria Iisakkila, Espoo (FI)

(73) Assignee: Nokia Corporation, Espoo (FI)

( * ) Notice: Subject to any disclaimer, the term of this patent is extended or adjusted under 35 U.S.C. 154(b) by 392 days.

(21) Appl. No.: 12/077,141

(22) Filed: Mar. 17, 2008

(65) Prior Publication Data

US 2009/0232022 A1 Sep. 17, 2009

(51) Int. Cl.
*H04L 12/28* (2006.01)
(52) U.S. Cl. ........................................ 370/254
(58) Field of Classification Search .................. None
See application file for complete search history.

(56) References Cited

U.S. PATENT DOCUMENTS

| | | | |
|---|---|---|---|
| 7,594,031 B2 * | 9/2009 | Horton et al. ............ | 709/245 |
| 2004/0004940 A1 | 1/2004 | Nischal et al. | |
| 2004/0127237 A1 * | 7/2004 | Hurtta .................... | 455/466 |
| 2004/0264474 A1 * | 12/2004 | Sbida ..................... | 370/395.5 |
| 2005/0152401 A1 * | 7/2005 | Wiljakka et al. ........ | 370/474 |
| 2005/0182829 A1 * | 8/2005 | King et al. .............. | 709/220 |
| 2006/0023712 A1 | 2/2006 | Shaheen | |
| 2006/0282554 A1 * | 12/2006 | Jiang et al. .............. | 710/14 |
| 2008/0037478 A1 * | 2/2008 | Na et al. ................. | 370/338 |
| 2009/0043902 A1 * | 2/2009 | Faccin .................... | 709/229 |
| 2010/0182955 A1 * | 7/2010 | Bjork et al. ............. | 370/328 |

FOREIGN PATENT DOCUMENTS

WO WO 2005/002171 1/2005

OTHER PUBLICATIONS

3rd Generation Partnership Project, General Packet Radio Service (GPRS) Enhancements for Evolved Universal Terrestrial Radio Access Network (E-UTRAN) Access, Release 8, Dec. 2007.
Nokia et al., "PDP Type Signalling During Attach and PDN Connection Establishment" 3GPP Draft, Mobile Competence Centre, vol. SA WG2, No. Jeju, Apr. 1, 2008, XP050264451.
3GPP: "3GPP TS 24.008 Version 4.7.0 Release 4 (Jun. 2002) ETSI," pp. 188-202, 274-284, and 392-412; 47 pages total.

* cited by examiner

*Primary Examiner* — Chirag G Shah
*Assistant Examiner* — Amarnauth Persaud
(74) *Attorney, Agent, or Firm* — Hollingsworth & Funk, LLC

(57) ABSTRACT

A method comprising: receiving, in a network element of a packet data core network, a network resource request from a user equipment, said request including indication on the user equipment's Internet Protocol (IP) version capability; creating, in said network element, a set of parameters for guiding the user equipment in IP address allocation at least in one packet data network, said set of parameters including at least a recommended version of IP address type to be used; and signalling said set of parameters to the user equipment as a response to the network resource request.

12 Claims, 3 Drawing Sheets

TRANSITION BETWEEN IP PROTOCOL VERSIONS

FIELD OF THE INVENTION

Figure 1:
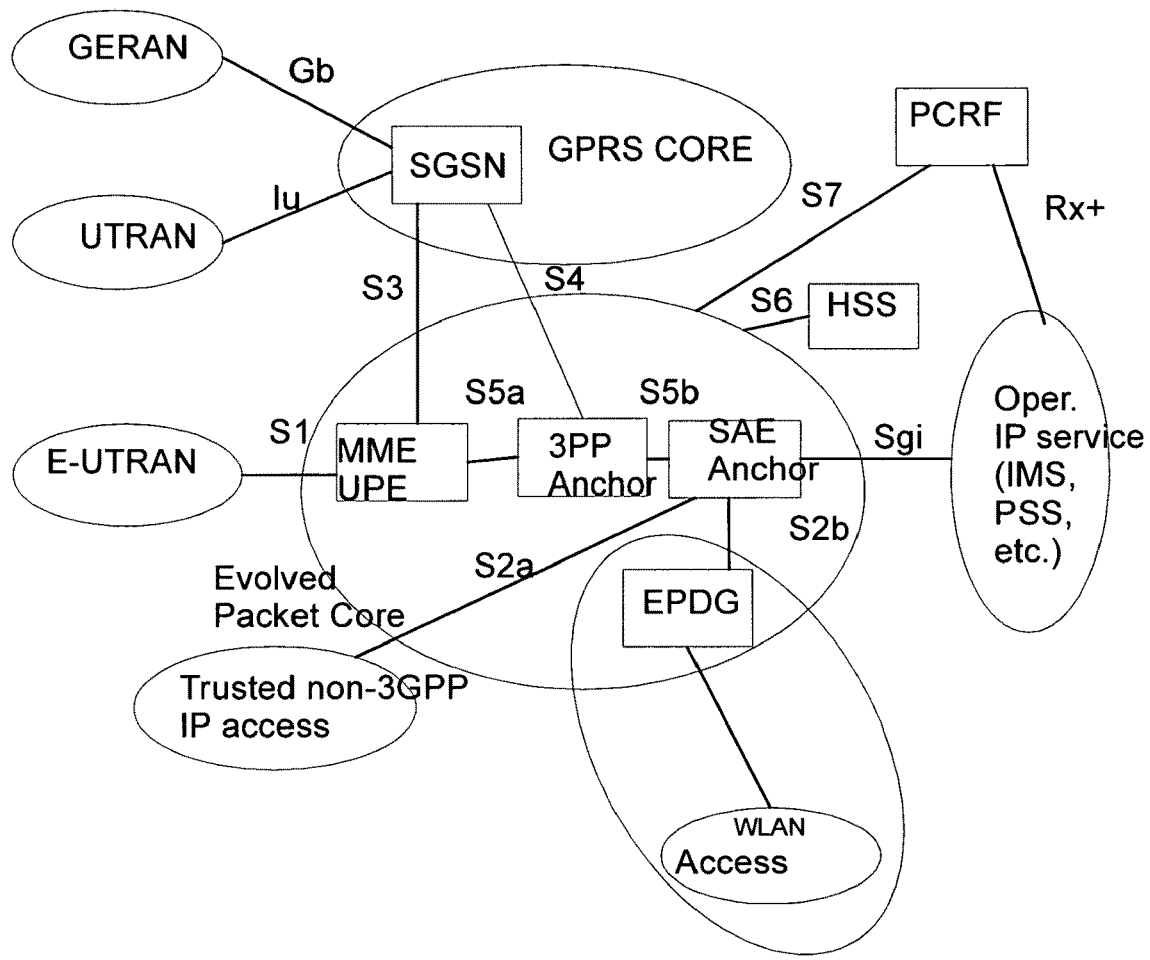

The present invention relates to packet data networks, and more particularly to transition between IP protocol versions.

BACKGROUND OF THE INVENTION

The continuous development of mobile communication systems has recently concentrated on post-3G systems, i.e. to the evolution of the 3GPP networks towards the "future" generation of mobile communication networks. There are many initiatives and development projects currently working on the issue, one of them being the Evolved Packet System (EPS), which is being specified in 3GPP release 8. The Evolved Packet Core (EPC) is expected to attach to various access networks, e.g. to UTRAN (Universal Terrestrial Radio Access Network), E-UTRAN (Evolved), GERAN (GSM EDGE Radio Access Network) and non-3GPP access networks. The EPS is specified as a packet-switched-only network and therefore, packet data handling needs to be optimised in the base design.

One of the key areas in the optimisation of packet data handling is the IP address management. During the planned deployment time frame of Release 8 networks and terminals, the transition from the Internet Protocol, version 4 (IPv4) to the Internet Protocol, version 6 (IPv6) is expected to ramp up. This transition phase needs to be supported in the Release 8 specifications.

Currently, Release 8 specifications support PDP (Packet Data Protocol) types IPv4 and IPv6 only for interworking and backwards compatibility purposes. Release 8 MMEs (Mobility Management Entity) and SGSNs (Serving GPRS Support Node) utilise only one PDP type v4v6 for all EPS bearers/PDP contexts. However, despite this modelling principle, any UE or EPS network element may support v4 only, v6 only or v4+v6 IP addressing. Consequently, the network operator may not be able to support IPv6 addressing in all parts of the network, for example in all PDNs, at least in early EPS deployment phase. Furthermore, even though a particular network operator would support IPv6 addressing in all parts of its own network, it cannot be guaranteed that a roaming network and its so-called legacy SGSNs would also support IPv6 or IPv4v6 addressing. Therefore, information about this should preferably be indicated to the UEs.

The U.S. Pat. No. 7,701,958 "Communication system supporting transition between network communication protocols" by Nischal et al discloses a system, wherein a network communication device implementing a dual IPv4/IPv6 stack acquires an IPv4 address only when necessary to communicate with IPv4 resources on the network. The network communication device uses an IPv6 address at the start of a communication session, and does not acquire an IPv4 address unless a need arises later in the session for communication with an IPv4 resource.

However, regardless the fact that the document describes the general idea of the conservation of the IPv4 address, it does not explain how the UE would know when to utilise this scheme.

SUMMARY OF THE INVENTION

Now there has been invented an improved method and technical equipment implementing the method, by which the above mentioned problems can be alleviated. Various aspects of the invention include a method, a network element, a terminal apparatus and a computer program, which are characterized by what is stated in the independent claims. Various embodiments of the invention are disclosed in the dependent claims.

According to a first aspect, a method according to the invention is based on the idea of receiving, in a network element of a packet data core network, a network resource request from a user equipment, said request including an indication on the user equipment's Internet Protocol (IP) version capability or a request for a particular PDP type; creating, in said network element, a set of parameters for guiding the user equipment in IP address allocation at least in one packet data network, said set of parameters including at least a recommended version of IP address type to be used; and signalling said set of parameters to the user equipment as a response to the network resource request.

According to an embodiment, the set of parameters further include information on at least one IP versions transition technology of the given type, which the user equipment should preferably use when accessed through said packet data network.

According to an embodiment, the set of parameters include a plurality of IP versions transition technologies in a form of a priority list recommending the user equipment to use the transition technology with the highest priority.

According to an embodiment, said transition technologies include at least one of the following: 6to4, ISATAP, Teredo, NAT-PT, MNAT-PT, L2TP, SNAT, NATv4v6v4.

According to an embodiment, said packet data core network is a core network of an Evolved Packet System (EPS) according to the 3GPP Release 8; said user equipment is a terminal according to the 3GPP Release 8; and said network resource request is involved with an initial attach procedure or a UE requested parallel PDN connectivity procedure according to the 3GPP Release 8.

According to an embodiment, said network element is a gateway for the packet data network, the method further comprising: including said set of parameters as a part of Protocol Configuration Options (PCO) according to the 3GPP Release 8; and signalling said set of parameters to the user equipment transparently from said gateway.

According to an embodiment, said network element is a gateway for the packet data network, the method further comprising: including said set of parameters as a part of a response message to the network resource request; sending the response message to a Mobility Management Entity (MME) of the EPS; and signalling said set of parameters as a part of a response message to the user equipment from the MME.

The arrangement according to the invention aims to solve above-mentioned problems, thus providing advantages for both the network operator and the operation of the UE. A benefit for the network operator is that the embodiments facilitate network operators to plan, deploy and control UE's usage of various IPv4 to IPv6 transitioning schemes. An additional benefit is the decreased setup time for IP-address configuration, as the UE does not need to do any transition scheme discovery (i.e. try to find out which transition mechanisms are available on the network). Also provisioning of transition scheme settings can be avoided, thus enabling simpler and more dynamic solution both for the network and the UE.

The further aspects of the invention include a network element, an apparatus (user equipment) and a computer program product applicable in the above-described method.

These and other aspects of the invention and the embodiments related thereto will become apparent in view of the detailed disclosure of the embodiments further below.

LIST OF DRAWINGS

Figure 2:
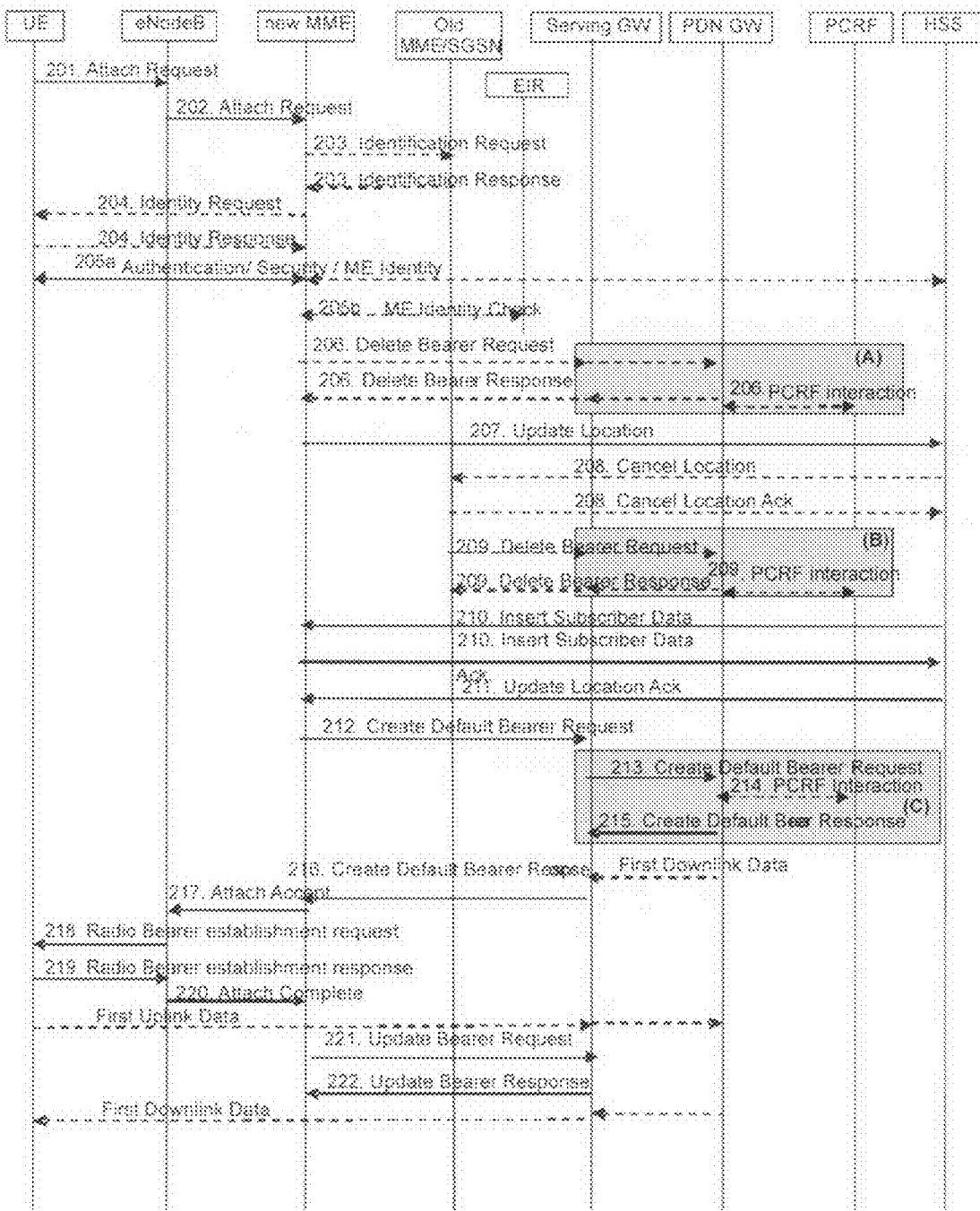
Figure 3:
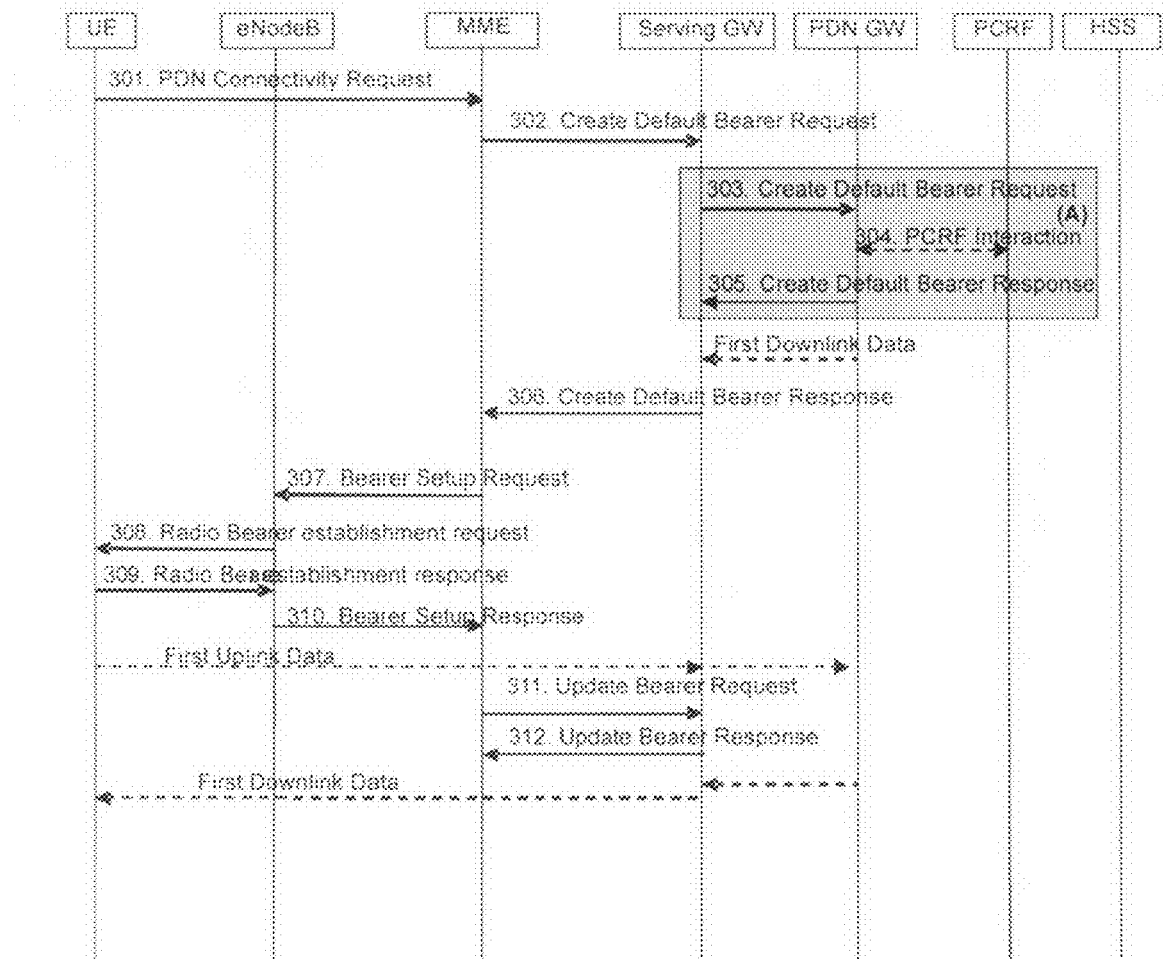

In the following, various embodiments of the invention will be described in more detail with reference to the appended drawings, in which FIG. 1 shows the Evolved Packet System (EPS) architecture on general level;

FIG. 2 shows a signalling chart according to an embodiment of the invention; and FIG. 3 shows a signalling chart according to another embodiment of the invention.

DESCRIPTION OF EMBODIMENTS

In the following, the invention will be illustrated by referring to the Evolved Packet System (EPS) as currently being specified in 3GPP release 8 specifications. It is, however, noted that the invention is not limited to the EPS solely, but it can be implemented in any network architecture confronting the above-mentioned problems. For example, the invention may be utilized in GPRS only networks, as a SGSN according to release 8 (and onwards) is connected to UTRAN or GERAN.

FIG. 1 illustrates the planned Evolved Packet System (EPS) architecture on general level. Compared to the present 3GPP network implementation, the EPS introduces several new interfaces and reference points.

S1 provides access to Evolved RAN radio resources for the transport of user plane and control plane traffic. The S1 reference point shall enable MME and UPE (User Plane Entity) separation and also deployments of a combined MME and UPE solution. S2a provides the user plane with related control and mobility support between a trusted non 3GPP IP access and the SAE (System Architecture Evolution) Anchor. S2b provides the user plane with related control and mobility support between ePDG (evolved Packet Data Gateway) and the SAE Anchor.

S3 enables user and bearer information exchange for inter 3GPP access system mobility in idle and/or active state. It is based on Gn reference point as defined between SGSNs. S4 provides the user plane with related control and mobility support between GPRS Core and the 3GPP Anchor and is based on Gn reference point as defined between SGSN and GGSN.

S5a provides the user plane with related control and mobility support between MME/UPE and 3GPP anchor. S5b provides the user plane with related control and mobility support between 3GPP anchor and SAE anchor. It is also possible that 3GPP anchor and SAE anchor are combined into one entity, even with the MME/UPE.

S6 enables transfer of subscription and authentication data for authenticating/authorizing user access to the evolved system (AAA interface). S7 provides transfer of (QoS) policy and charging rules from PCRF (Policy and Charging Rules Function) to PCEP (Policy and Charging Enforcement Point).

SGi is the reference point between the Inter AS Anchor and the packet data network (PDN). Packet data network may be an operator external public or private packet data network or an intra operator packet data network, e.g. for provision of IMS services. This reference point corresponds to Gi and Wi functionalities and supports any 3GPP and non-3GPP access systems.

A fundamental aspect of the EPS is that it is specified as a packet-switched only network ("All-IP network") and therefore packet data handling needs to be considered from the very beginning. This, in turn, relates to the overall transition in the Internet Protocol (IP) domain from the Internet Protocol, version 4 (IPv4) to the Internet Protocol, version 6 (IPv6). It is evident that this transition will take several years, and the transition issues needs to be considered also in the deployment of EPS.

Currently, Release 8 specifications support PDP types IPv4 and IPv6 only for interworking and backwards compatibility purposes. Release 8 MMEs and SGSNs utilise only one PDP type v4v6 for all EPS bearers/PDP contexts. However, despite this modelling principle, any UE or EPS network element may support v4 only, v6 only or v4+v6 IP addressing. A network operator may have a plurality of PDNs, some of the PDNs supporting both IPv4 and IPv6 addressing, but some of the PDNs supporting only IPv4 addressing, for example.

Accordingly, the UE needs to be able to behave differently in different PDNs with regards to requesting and releasing IPv4 or IPv6 addresses. Furthermore, the UE needs to understand, which IPv6-over-IPv4 or IPv4-over-IPv6 transition technology is preferred by the network operator. Moreover, the network operator may not be able to support IPv6 addressing in all parts of the network, for example in all PDNs, at least in early EPS deployment phase. In this case, the operator may wish to indicate the preferred or supported IPv6-over-IPv4 transition technology.

Now in order to alleviate these problems, the core network is arranged to signal instructions to a terminal according to the 3GPP Release 8 specifications, said instructions being specific to one or more PDNs and guiding the terminal to restrict the usage of a given address type (v4 or v6) in said PDN so that it requests for it when an application requiring this address type is initiated. At the same time, the terminal should refrain from requesting for an address of the other IP version type, unless needed. When the application is terminated, the requested address type is released.

According to an embodiment, said instructions further include information on a transition technology of the given type, which the terminal should preferably use when accessed through said PDN. According to an embodiment, said transition technologies, when considering transition as IPv6-over-IPv4 include at least one of the following: 6to4, ISATAP, Teredo, NAT-PT. IPv4-over-IPv6 transition technologies may include at least one of the following: MNAT-PT, L2TP, SNAT, NATv4v6v4. These instructions, including at least the recommendation of the address type and preferably of the transition technology, may be referred by the name "PDN Address Policy".

According to an embodiment, the PDN address policy signalled by the core network includes a plurality of transition technologies in a form of a priority list, whereby the UE should preferably use the transition technology with the highest priority. The order of the transition technologies in the priority list depends on the deployment preferences of the particular network operator, which in turn may depend on operational costs, operational complexity or interoperability likelihood with other operators, for example. Considering the operational costs, an example of the IPv6-over-IPv4 transition technology priority list could be: 6to4, ISATAP, Teredo.

Regarding the usage of v4 and v6 addresses, there can be found several reasons why the network operator may prefer that IPv4/IPv6 capable UEs do not always request for both address types, but the operator may want to restrict or favour one of the address types. Particularly, in early EPS deployment phase, the operator may not be able to support IPv6 addressing in all parts of the network, for example in all PDNs. In this case, the operator may wish to indicate the preferred or supported IPv6-over-IPv4 transition technology at least for PDNs not supporting IPv6.

During transition phase from IPv4 to IPv6, a possible scenario is that the operator does not have a sufficient pool of IPv4 addresses, thus mandating the described embodiments which restrict IPv4 addresses to be requested by the UE only when needed for a given application and to be released when this application is terminated. In this case, the operator may wish to indicate the preferred or supported IPv4-over-IPv6 transition technology to be utilised for those applications, which are capable of using this given transition technology. However, in early EPS deployment phase the applications within a given PDN may be predominantly IPv4-only, which means that IPv4 address conservation schemes may not be applied in full extent.

Consequently, the embodiments provide advantages for both the network operator and the operation of the UE. A benefit for the network operator is that the embodiments facilitate network operators to plan, deploy and control UE's usage of various IPv4 to IPv6 transitioning schemes. An additional benefit is the decreased setup time for IP-address configuration, as the UE does not need to do any transition scheme discovery (i.e. try to find out which transition mechanisms are available on the network). Also provisioning of transition scheme settings can be avoided, thus enabling simpler and more dynamic solution both for the network and the UE.

According to an embodiment, the PDN Address Policy information can be signalled to the UE by the MME during the initial attach procedure and during the UE requested parallel PDN connectivity procedure. Likewise, the PDN address policy information can be signalled to the UE by the Release 8 SGSN during the initial attach procedure and during the activation of a primary PDP context.

According to an alternative embodiment, instead that the MME or the Release 8 SGSN signalling the PDN Address Policy information, it may also be carried out by the PDN gateway directly to the UE. Instead of the Release 8 SGSN, it is also possible that a Release 8 GGSN signals the PDN Address Policy information directly to the UE. For this purpose, Protocol Configuration Options (PCO) may be used to transfer the PDN Address Policy information, since the PCO is a set of parameters sent transparently through the MME and the Serving GW in the attach procedure.

According to a further embodiment, the PDN address policy information can also be signalled after the attach procedure or the UE requested parallel PDN connectivity procedure or the primary PDP context activation procedures within IETF protocols such as DHCP.

Regarding the operation of the UE, upon receiving the PDN address policy from the core network, the UE stores the PDN address policy information in its memory, and when an application requiring a given address type is initiated, the UE requests only said address type and refrains from requesting another address type. Thus, the UE preferably comprises a transmitter for transmitting a network resource request to a packet data core network, said request including indication on the Internet Protocol (IP) version capability of the UE or a request for a particular PDP type, a receiver for receiving signalling from the packet data core network as a response to the network resource request, said signalling including a set of parameters comprising at least a recommended version of IP address type to be used at least in one packet data network, and a memory for storing said set of parameters As mentioned above, the PDN address policy may include a priority list of transition technologies recommended by the network. It is rather probable that the transition technology positioned first in the priority list is also supported by the UE, whereby the UE naturally selects the first transition technology in the list.

However, it is also possible in certain cases that the UE does not support the first transition technology in the priority list submitted by the core network, or the UE may include its internal priority list of transition technologies, which does not coincide with the order of the core network's priority list. For such a case, there should be a mechanism for selecting the transition technology to be used.

According to an embodiment, the priority list submitted by the core network is preferred over the UE's own list, i.e. the first transition technology in the priority list of the core network, which is supported by the UE is selected as the transition technology to be used. According to another embodiment, the UE's own priority list is preferred over the priority list submitted by the core network, i.e. the first transition technology in the UE's own priority list, which is also included in the priority list of the core network is selected as the transition technology to be used.

According to a further embodiment, the selection of the transition technology to be used is made as interaction of both the priority list submitted by the core network and the UE's own list. A skilled person appreciates that there are various ways how this interaction could be implemented. As an example, the transition technologies in the lists could be given a numerical value corresponding their order in the list. Let us suppose that the PDN address policy submitted by the network includes the following transition technologies: A, B, C, whereby A would be given a value of 1, B would be given a value of 2 and C would be given a value of 3. Then the UE's internal address policy includes the following transition technologies: E, C, D, B whereby E would be given a value of 1, C would be given a value of 2, D would be given a value of 3 and B would be given a value of 4. Now regarding the transition technologies included in both lists, i.e. B and C, B would be given total value of 2+4=6 and C would be given total value of 3+2=5. Thereby, C would be selected as the transition technology to be used, since it has the highest overall priority (the lowest total value). B could be selected as an auxiliary transition technology to be used, in case that C does not function properly.

Some of these embodiments are described more in detail in the following by referring to the FIGS. 2 and 3. The most steps of these procedures are known already from the 3GPP specification TS 23.401, version 8.0.0, dated 13.12.2007. These known steps are discussed only briefly, and as regards to their more detailed implementation, a reference is made to said document.

FIG. 2 illustrates the initial attach procedure and signalling the PDN address policy information during it, wherein the MME performs the signalling of the PDN Address Policy information to the UE. In addition to the network elements disclosed in FIG. 1, FIG. 2 further discloses an evolved NodeB, i.e. a base station located in a radio access network (RAN).

The UE initiates the Attach procedure by the transmission of an Attach Request message (201) together with an indication of the Selected Network to the eNodeB. The PDN Address Allocation indicates whether the UE wants to perform the IP address allocation during the attach procedure and, when known, it indicates the UE IP version capability (IPv4, IPv4/IPv6, IPv6), which is the capability of the IP stack associated with the UE. The eNodeB forwards (202) the Attach Request message to the new MME.

It should, however, be noted that in some cases the UE may not be aware of the capability of the IP stack associated with the UE. This may be the case, for example, with a so-called split terminal, which consists of a base terminal T and one or more communicating equipments E connected to the base terminal T. The base terminal T may be, for example, a mobile terminal or a personal computer allowing the addition of communicating equipments E to them. The communicating equipments E can be of different types, for example a public communication terminal with an email service, a communicating parking meter, a PC type personal computer, etc. The base terminal T and the communicating equipments E as combined form the split terminal, but the base terminal may not necessarily know the capability of the IP stack associated with the communicating equipments E. Thus, instead of including the capability of the IP stack associated with the UE in the UE IP version capability, the UE would include a PDP type request, whereby it requests for v4v6 PDP type from the network. Furthermore, a PDP type request (v4, v6, v4v6) may substitute the signalling of the IP version capability indication even for cases where the capability of the IP stack is known within the UE.

The following steps (203-206) are optional in the sense that they will only take place if a predefined condition (a prior procedure carried out/not carried out, a piece of information is missing, etc.) is met. If the UE identifies itself with GUTI and the MME has changed since detach, the new MME sends (203) either an Identification Request (old GUTI) to the old MME to request the IMSI, or if the S-TMSI and old TAI identifies an SGSN, to the old SGSN. The old MME/SGSN responds (203) with an Identification Response.

If the UE is unknown in both the old MME/SGSN and new MME, the new MME sends (204) an Identity Request to the UE to request the IMSI. The UE responds (204) with Identity Response (IMSI). If no UE context for the UE exists anywhere in the network, authentication (205a) is mandatory, otherwise this step is optional. As a part of the authentication procedure, the MME may send (205b) the ME Identity Check Request (ME Identity, IMSI) to the EIR. The EIR shall respond with ME Identity Check Ack (Result).

If there are active bearer contexts in the new MME for this particular UE (i.e. the UE re-attaches to the same MME without having properly detached before), the new MME deletes these bearer contexts by sending (206) Delete Bearer Request messages to the GWs involved. The GWs acknowledge with Delete Bearer Response message. If a PCRF is deployed, the PDN GW interacts with the PCRF to indicate that resources have been released.

Then if the MME has changed since the last detach, or if it is an Initial Attach, the new MME sends (207) an Update Location (MME Identity, IMSI, ME Identity) to the HSS. The HSS sends (208) Cancel Location (IMSI, Cancellation Type) to the old MME with Cancellation Type set to Update Procedure. The old MME acknowledges (208) with Cancel Location Ack (IMSI) and removes the MM and bearer contexts. Furthermore, if there are active bearer contexts in the old MME for this particular UE, the old MME deletes these bearer contexts by sending (209) Delete Bearer Request messages to the GWs involved with a similar process as in step 206 above. Thereby the old MME and the bearer contexts related thereto are removed completely from the process.

The HSS sends (210) Insert Subscriber Data (IMSI, Subscription Data) message to the new MME. The Subscription Data contains the list of all APNs that the UE is permitted to access, an indication about which of those APNs is the Default APN, and the 'EPS subscribed QoS profile' for each permitted APN. The new MME validates the UE's presence in the (new) TA. If all checks are successful then the new MME constructs a context for the UE and returns (210) an Insert Subscriber Data Ack message to the HSS. The Default APN shall be used for the remainder of this procedure. Thereafter, the HSS acknowledges the Update Location message (207) by sending (211) an Update Location Ack to the new MME.

If the PDN subscription context contains no PDN GW address, the new MME selects a PDN GW according to predefined criteria. If the PDN subscription profile contains a PDN GW address and the Attach Type does not indicate "Handover", the MME may select a new PDN GW e.g. to allocate a PDN GW that allows for more efficient routing. The new MME selects a Serving GW and allocates an EPS Bearer Identity for the Default Bearer associated with the UE. Then it sends (212) a Create Default Bearer Request message to the selected Serving GW. The Serving GW creates a new entry in its EPS Bearer table and sends (213) a Create Default Bearer Request message to the PDN GW. After this step, the Serving GW buffers any downlink packets it may receive from the PDN GW until receives an Update Bearer Request message in step 221 below. If dynamic PCC is deployed, the PDN GW interacts (214) with the PCRF to get the default PCC rules for the UE.

Now the PDN GW returns (215) a Create Default Bearer Response message to the Serving GW. The Create Default Bearer Response message includes preferably the following parameters: PDN GW Address for the user plane, PDN GW TEID of the user plane, PDN GW TEID of the control plane, PDN Address Information, PDN Address Policy, EPS Bearer Identity, Protocol Configuration Options) PDN Address Information is included if the PDN GW allocated a PDN address Based on PDN Address Allocation received in the Create Default Bearer Request. PDN Address Information contains an IPv4 address for IPv4 and/or an IPv6 prefix and an Interface Identifier for IPv6. The PDN GW takes into account the UE IP version capability or PDP type request indicated in the PDN Address Allocation and the policies of operator when the PDN GW allocates the PDN Address Information. Whether the IP address is negotiated by the UE after completion of the Attach procedure, this is indicated in the Create Default Bearer Response.

As a part of the Create Default Bearer Response message, the PDN GW also includes the PDN Address Policy information. The PDN Address Policy guides UE behaviour for IP address allocation taking place after the Attach procedure and within the same PDN. The PDN Address Policy instructs the UE, which IP address type is preferred for initial address allocation for the default bearer and may indicate the recommended transition technology/technologies.

The Serving GW returns (216) a Create Default Bearer Response message including the PDN Address Policy information to the new MME, which sends (217) an Attach Accept message to the eNodeB. The Attach Accept message includes all the necessary information required for radio bearer establishment, and also the PDN Address Policy information.

The eNodeB sends (218) Radio Bearer Establishment Request including an EPS Radio Bearer Identity and the Attach Accept message to the UE. The UE shall store the QoS Negotiated, Radio Priority and Packet Flow Id for use when accessing via GERAN or UTRAN. The APN is provided to the UE to notify it of the APN for which the activated default bearer is associated. The UE shall also store the PDN Address Policy information for further usage to request only a given address type, when an application requiring this address type is initiated.

Then the UE sends (219) the Radio Bearer Establishment Response to the eNodeB. In this message, the Attach Complete Message will be included, and the eNodeB forwards (220) the Attach Complete message to the new MME. After the Attach Accept message and once the UE has obtained a PDN Address Information, the UE can then send uplink packets towards the eNodeB and the packets will then be tunnelled to the Serving GW and PDN GW. Now depending on the application of the UE that is sending uplink packets, the UE preferably adheres to the recommended IP address type and the given transition technology included in the PDN Address Policy information.

The new MME sends (221) an Update Bearer Request message to the Serving GW, and the Serving GW acknowledges this by sending (222) Update Bearer Response message to the new MME. Then finally the Serving GW can send its buffered downlink packets.

FIG. 3 illustrates the embodiment, wherein the PDN address policy information is signalled during the UE Requested PDN procedure, wherein the UE is assumed to be in active mode. Also in the embodiment of FIG. 3, the MME performs the signalling of the PDN Address Policy information to the UE.

The UE initiates the UE Requested PDN procedure by the transmission (301) of a PDN Connectivity Request (APN, PDN Address Allocation, Protocol Configuration Options) message. The PDN Address Allocation indicates whether the UE wants to perform the IP address allocation during the execution of the procedure and, when known, it indicates the UE IP version capability (IPv4, IPv4/IPv6, IPv6), which is the capability of the IP stack associated with the UE.

Here again, if the UE IP version capability is unknown to the UE, for example as in case of a split terminal, then instead of including the capability of the IP stack associated with the UE in the UE IP version capability, the UE would include a PDP type request, whereby it requests for v4v6 PDP type from the network. The PDP type request (v4, v6, v4v6) may also be used to substitute the IP version capability indication for cases, where the capability of the IP stack is known to the UE.

The MME verifies that the APN provided by UE is allowed by subscription. Protocol Configuration Options (PCO) are used to transfer parameters between the UE and the PDN GW, and are sent transparently through the MME and the Serving GW.

Now the following steps (302-312) are almost similar to the steps 212-222 described above. Accordingly, the MME selects a PDN GW according to predefined criteria, and sends (302) a Create Default Bearer Request message to the selected Serving GW. The Serving GW creates a new entry in its EPS Bearer table and sends (303) a Create Default Bearer Request message to the PDN GW. After this step, the Serving GW buffers any downlink packets it may receive from the PDN GW until receives an Update Bearer Request message in step 301 below. The PDN GW may also interact (304) with the PCRF to get the default PCC rules for the UE, if necessary.

Then the PDN GW returns (305) a Create Default Bearer Response message to the Serving GW. Along with other information, the PDN GW also includes the PDN Address Policy information in the Create Default Bearer Response message. Also in the UE Requested PDN procedure the PDN Address Policy guides UE behaviour for IP address allocation taking place after the Attach procedure and within the same PDN. The PDN Address Policy instructs the UE, which IP address type is preferred for initial address allocation for the default bearer and may indicate the recommended transition technology/technologies.

The Serving GW returns (306) a Create Default Bearer Response message including the PDN Address Policy information to the MME, which sends (307) a PDN Connectivity Accept message to the eNodeB. The PDN Connectivity Accept message is inserted in a Bearer Setup Request control message, which includes all the necessary information required for radio bearer establishment, and also the PDN Address Policy information.

The eNodeB sends (308) Radio Bearer Establishment Request including the PDN Connectivity Accept message to the UE. The UE shall store the PDN Address Policy information for further usage to request only a given address type, when an application requiring this address type is initiated.

Then the UE sends (309) the Radio Bearer Establishment Response to the eNodeB, which forwards (310) a Bearer Setup Response control message to the MME. After the Attach Accept message and once the UE has obtained a PDN Address Information, the UE can then send uplink packets towards the eNodeB and the packets will then be tunnelled to the Serving GW and PDN GW. Again, depending on the application of the UE that is sending uplink packets, the UE preferably adheres to the recommended IP address type and the given transition technology included in the PDN Address Policy information.

The MME sends (311) an Update Bearer Request message to the Serving GW, and the Serving GW acknowledges this by sending (312) Update Bearer Response message to the new MME. Then finally the Serving GW can send its buffered downlink packets.

Both of the embodiments disclosed in FIG. 2 and in FIG. 3 suggest an implementation, wherein the PDN Address Policy information is signalled from the PDN GW to UE via the serving GW and the MME. However, as mentioned above, it is also possible to signal them from the PDN gateway directly to the UE by including the PDN Address Policy information as a part of the Protocol Configuration Options (PCO) (see steps 215, 305 above), since the PCO is sent transparently through the MME and the Serving GW. In such a case, the remaining signalling procedures are otherwise similar to those of FIGS. 2 and 3.

A skilled man appreciates that any of the embodiments described above may be implemented as a combination with one or more of the other embodiments, unless there is explicitly or implicitly stated that certain embodiments are only alternatives to each other.

From the core network's point of view, the invention is implemented in a network element, preferably in the PDN GW. The network element preferably includes a receiver for receiving a network resource request from the UE, said request including indication on the UE's IP version capability or PDP type request, a processing unit for creating a set of parameters for guiding the UE in IP address allocation a PDN, said set of parameters including at least a recommended version of IP address type to be used, and a transmitter for signalling said set of parameters to the UE as a response to the network resource request.

The functionalities of the invention may be implemented in the network element or in the UE preferably as a computer program stored in a memory, which computer program, when executed in a central processing unit CPU or in a dedicated digital signal processor DSP, affects the network element or the UE to implement procedures of the invention. Functions of the computer program SW may be distributed to several separate program components communicating with one another. The computer software may be stored into any memory means, such as the hard disk of a PC or a CD-ROM disc, from where it can be loaded into the memory of network element or in the UE. The computer software can also be loaded through a network, for instance using a TCP/IP protocol stack.

It is also possible to use hardware solutions or a combination of hardware and software solutions to implement the inventive means. Accordingly, the above computer program product can be at least partly implemented as a hardware solution, for example as ASIC or FPGA circuits, in a hardware module comprising connecting means for connecting the module to an electronic device, or as one or more integrated circuits IC, the hardware module or the ICs further including various means for performing said program code tasks, said means being implemented as hardware and/or software.

One aspect of the invention is naturally the user equipment UE, which upon receiving the PDN Address Policy information stores it for further usage, and when an application requiring a given address type is initiated, the UE preferably adheres to the recommended IP address type and the given transition technology included in the PDN Address Policy information and requests only that given address type.

It is obvious that the present invention is not limited solely to the above-presented embodiments, but it can be modified within the scope of the appended claims.

The invention claimed is:

1. A method comprising:
receiving, in a network element of a packet data core network, a network resource request from a user equipment, said request including an indication on the user equipment's internet protocol version capability or a request for a particular packet data protocol type;
creating, in said network element, a set of parameters for guiding the user equipment in IP address allocation at least in one packet data network, said set of parameters including at least a recommended version of internet protocol address type to be used and information on a plurality of internet protocol versions transition technologies of the given type in a form of a first priority list recommending the user equipment to use the transition technology with the highest priority to be used by the user equipment when accessing through said packet data network; and
signalling said set of parameters to the user equipment as a response to the network resource request to be used by the user equipment in requesting the recommended version of internet protocol address type, wherein the user equipment selects a transition technology to be used from the first priority list and a second priority list of supported internet protocol versions transition technologies internal to the user equipment.

2. The method according to claim 1, wherein said transition technologies include at least one of the following: 6 to 4, ISATAP, Teredo, NAT-PT, MNAT-PT, L2TP, SNAT, NATv4v6v4.

3. The method according to claim 1, wherein said packet data core network is a core network of an Evolved Packet System (EPS) according to the 3GPP Release 8; said user equipment is a terminal according to the 3GPP Release 8; and said network resource request is involved with an initial attach procedure or a UE requested parallel PDN connectivity procedure according to the 3GPP Release 8.

4. The method according to claim 3, wherein said network element is a gateway for the packet data network, the method further comprising:
including said set of parameters as a part of Protocol Configuration Options (PCO) according to the 3GPP Release 8; and
signalling said set of parameters to the user equipment transparently from said gateway.

5. The method according to claim 3, wherein said network element is a gateway for the packet data network, the method further comprising:
including said set of parameters as a part of a response message to the network resource request;
sending the response message to a Mobility Management Entity (MME) of the EPS; and
signalling said set of parameters as a part of a response message to the user equipment from the MME.

6. The method according to claim 1, wherein said packet data core network is a core network of an Evolved Packet System (EPS) according to the 3GPP Release 8; said user equipment is a terminal according to the 3GPP Release 8; and the response to said network resource request is signalled after an attach procedure or a UE requested parallel PDN connectivity procedure or a primary PDP context activation procedure within IETF protocols such as DHCP.

7. A network element, comprising:
at least one processing unit;
at least one memory including computer program code, the at least one memory and the computer program code configured to, with at least one processing unit, cause the apparatus to:
receive a network resource request from a user equipment, said request including an indication on the user equipment's internet protocol version capability or a request for a particular packet data protocol type;
create a set of parameters for guiding the user equipment in internet protocol address allocation in at least one packet data network, said set of parameters including at least a recommended version of internet protocol address type to be used and information on a plurality of internet protocol versions transition technologies of the given type in a form of a first priority list recommending the user equipment to use the transition technology with the highest priority, which the user equipment should preferably use when accessed through said packet data network; and
signal said set of parameters to the user equipment as a response to the network resource request to be used by the user equipment in requesting the recommended version of internet protocol address type, and wherein the user equipment selects a transition technology to be used from the first priority list and a second priority list internal to the user equipment of supported internet protocol versions transition technologies.

8. An apparatus comprising:
an internal priority list of supported internet protocol versions transition technologies;
at least one processing unit; and
at least one memory including computer program code, the at least one memory and the computer program code configured to, with the at least one processing unit, cause the apparatus to:
transmit a network resource request to a packet data core network, said request including an indication on the internet protocol version capability of the apparatus or a request for a particular packet data protocol type;
receive signalling from said packet data core network as a response to the network resource request, said signalling including a set of parameters comprising at least a recommended version of internet protocol address type to be used at least in one packet data network and information on a plurality of internet protocol versions transition technologies of the given type in a form of a second priority list recommending the apparatus to use the transition technology with the highest priority in said the set of parameters to be used when the apparatus accesses through said packet data network;

select a transition technology to be used from said priority list and said internal priority list; and request the recommended version of internet protocol address type and refrain from requesting another internet protocol address type, when an application requiring said address type is initiated.

9. The apparatus according to claim 8, wherein the at least one memory and the computer program code are further configured to, with the at least one processor, cause the apparatus to prefer the priority list submitted by the packet data core network over the internal priority list of the apparatus, whereby the first transition technology in the priority list of the packet data core network, which is supported by the apparatus is selected as the transition technology to be used.

10. The apparatus according to claim 8, wherein the at least one memory and the computer program code are further configured to, with the at least one processor, cause the apparatus to prefer the internal priority list of the apparatus over the priority list submitted by the packet data core network, whereby the first transition technology in the internal priority list of the apparatus, which is also included in the priority list of the packet data core network is selected as the transition technology to be used.

11. The apparatus according to claim 8, wherein the at least one memory and the computer program code are further configured to, with the at least one processor, cause the apparatus to select the transition technology to be used as interaction of both the priority list submitted by the packet data core network and the internal priority list of the apparatus.

12. A non-transitory computer readable medium storing computer program code that is executable in a data processing device comprising an internal priority list of supported internet protocol versions transition technologies, wherein the computer program code is executable to cause the data processing device to perform:

creating a network resource request to be transmitted to a packet data core network, said request including an indication on the internet protocol version capability of the data processing device or a request for a particular packet data protocol type;

in response to receiving signalling from said packet data core network as a response to the network resource request, storing a set of parameters received in said signalling in a memory, said set of parameters comprising at least a recommended version of internet protocol address type to be used at least in one packet data network and information on a plurality of internet protocol versions transition technologies of the given type in a form of a priority list recommending the data processing device to use the transition technology with the highest priority, which the user equipment should preferably use when accessed through said packet data network;

selecting a transition technology to be used from said priority list and said internal priority list; and requesting the recommended version of internet protocol address type, when an application requiring said address type is initiated.

* * * * *